US012692894B2

(12) United States Patent　　　　(10) Patent No.:　US 12,692,894 B2

Millet et al.　　　　　　　　　　　　(45) Date of Patent:　　　Jul. 28, 2026

(54) ASSEMBLY COMPRISING A NUT AND A RETAINING SYSTEM FOR SAID NUT, MOUNTING SYSTEM COMPRISING AT LEAST ONE SUCH NUT AND THE RETAINING SYSTEM THEREFOR

(71) Applicant: Airbus Operations SAS, Toulouse (FR)

(72) Inventors: Gérard Millet, Toulouse (FR); Vincent Delpy, Toulouse (FR); Simon Foucart-Gaudy, Toulouse (FR); Marc-Antoine Brocard, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 408 days.

(21) Appl. No.: 18/402,998

(22) Filed: Jan. 3, 2024

(65) Prior Publication Data

US 2024/0218900 A1　　Jul. 4, 2024

(30) Foreign Application Priority Data

Jan. 4, 2023　(FR) ....................................... 2300046

(51) Int. Cl.
　　*F16B 37/04*　　　　(2006.01)
(52) U.S. Cl.
　　CPC ................................. *F16B 37/044* (2013.01)
(58) Field of Classification Search
　　CPC ........................... F16B 37/043; F16B 37/044
　　USPC .................................. 411/112, 119, 120, 121
　　See application file for complete search history.

(56) References Cited

U.S. PATENT DOCUMENTS

| | | | | |
|---|---|---|---|---|
| 2,390,752 | A | 12/1945 | Tinnerman | |
| 2,867,258 | A * | 1/1959 | Flora ..................... | F16B 37/044 411/113 |
| 3,020,947 | A * | 2/1962 | Mckelvey ............. | F16B 37/044 411/111 |
| 3,126,038 | A * | 3/1964 | Jaworski ............... | F16B 37/044 411/112 |
| 3,189,076 | A * | 6/1965 | Adams ................... | F16B 37/043 411/113 |
| 3,192,823 | A * | 7/1965 | Munse .................. | F16B 37/044 411/970 |
| 3,315,721 | A * | 4/1967 | Koehl ................... | F16B 37/044 411/113 |
| 3,695,324 | A * | 10/1972 | Gulistan ................. | B23P 11/00 411/111 |

(Continued)

FOREIGN PATENT DOCUMENTS

EP　　　　　2175148 A2　　4/2010

OTHER PUBLICATIONS

French Search Report for corresponding French Patent Application No. 2300046 dated Jul. 18, 2023; priority document.

*Primary Examiner* — Nicholas L Foster
(74) *Attorney, Agent, or Firm* — Greer, Burns & Crain, Ltd.

(57) ABSTRACT

An assembly comprising a nut, in addition to a retaining system which is configured to retain the hole of the nut substantially in the extension of a through-hole of a part. The retaining system comprises at least two resilient tabs which are configured to be housed in the through-hole of the part, the free ends of the resilient tabs being positioned, in the undeformed state, on a circle having a greater diameter than an internal diameter of the through-hole. Also a mounting system comprising such a retaining system for a nut.

12 Claims, 3 Drawing Sheets

(56)                    References Cited

U.S. PATENT DOCUMENTS

| | | | | |
|---|---|---|---|---|
| 3,729,040 A * | 4/1973 | Whiteside | .............. | F16B 37/042 |
| | | | | 411/968 |
| 3,765,078 A * | 10/1973 | Gulistan | ................. | B23P 11/00 |
| | | | | 29/523 |
| 4,186,787 A * | 2/1980 | Husain | .................. | F16B 37/065 |
| | | | | 411/183 |
| 4,557,650 A * | 12/1985 | Molina | ................. | F16B 37/044 |
| | | | | 411/108 |
| 8,647,035 B2 * | 2/2014 | Bakken | ................. | F16B 17/006 |
| | | | | 411/108 |
| 9,114,449 B2 * | 8/2015 | Ross | ..................... | F16B 37/044 |
| 2005/0169727 A1 | 8/2005 | Cosenza | | |
| 2011/0150599 A1 * | 6/2011 | Bakken | ................. | F16B 17/006 |
| | | | | 29/525.11 |
| 2012/0317787 A1 * | 12/2012 | Ross | ...................... | B21D 39/04 |
| | | | | 411/174 |

* cited by examiner

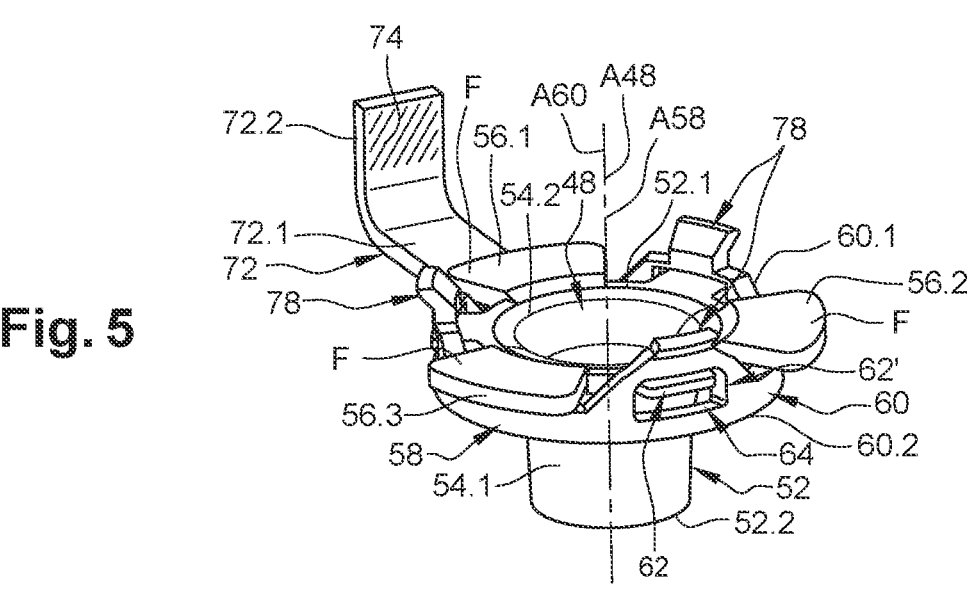
Fig. 5
Fig. 6
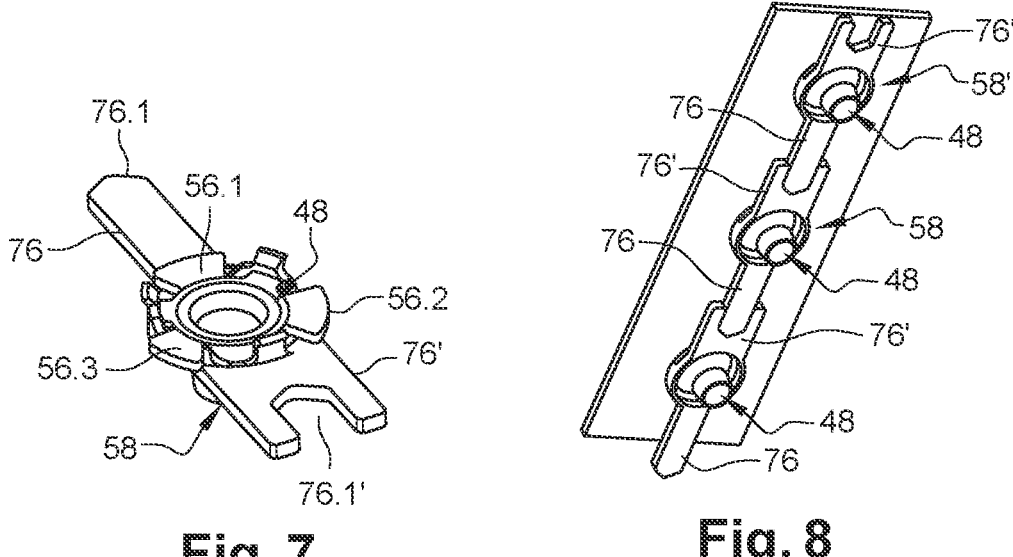
Fig. 7          Fig. 8

ASSEMBLY COMPRISING A NUT AND A RETAINING SYSTEM FOR SAID NUT, MOUNTING SYSTEM COMPRISING AT LEAST ONE SUCH NUT AND THE RETAINING SYSTEM THEREFOR

CROSS-REFERENCES TO RELATED APPLICATIONS

This application claims the benefit of French Patent Application Number 2300046 filed on Jan. 4, 2023, the entire disclosure of which is incorporated herein by way of reference.

FIELD OF THE INVENTION

The present application relates to an assembly comprising a nut and a retaining system for said nut in addition to a mounting system comprising at least one such nut and the retaining system therefor.

BACKGROUND OF THE INVENTION

According to one embodiment which can be seen in FIG. 1, a mounting system comprises at least first and second parts 10, 12, in addition to at least one bolt 14 connecting the first and second parts 10, 12. The bolt 14 comprises, on the one hand, a screw 16 which has a shank 16.1 which is at least partially threaded, in addition to a head 16.2 and, on the other hand, a nut 18 which has at least one bearing face 18.1 in addition to a tapped hole 18.2 which is configured to be screwed onto the shank 16.1 of the screw 16. The first part 10 comprises a first through-hole 20.1 which is configured to permit the passage of the shank 16.1 of the screw 16 and which opens out in the region of the first and second faces 10.1, 10.2, the first face 10.1 being oriented toward the second part 12. The second part 12 comprises a second through-hole 20.2 which is configured to permit the passage of the shank 16.1 of the screw 16 and which opens out in the region of the first and second faces 12.1, 12.2, the first face 12.1 being oriented toward the first part 10. According to one configuration, the second part 12 has a small thickness and a narrow edge 12.3 in the vicinity of the second through-hole 20.2.

The mounting system comprises a retaining system 22 which is illustrated in detail in FIGS. 2 and 3 and which is configured to retain the nut 18 in the extension of the second through-hole 20.2 of the second part 12 before the screw 16 is screwed on. This retaining system 22 in the form of a clamp comprises first and second side portions 24, 26 which are connected by a base 28 and positioned on either side of the second part 12, the first side portion 24 being positioned between the first and second parts 10, 12 and the second side portion 26 being applied against the second face 12.2 of the second part 12. Each of the first and second side portions 24, 26 comprises a through-orifice 24.1. 26.1 to permit the passage of the shank 16.1 of the screw 16.

The nut 18 comprises diametrically opposing first and second radial tabs 30.1, 30.2. In addition, the retaining system 22 comprises first and second housings 32.1, 32.2 which are fixed to the second side portion 26 and which are configured to house respectively the first and second radial tabs 30.1, 30.2 and to ensure a retention of the nut 18, in addition to the locking in rotation thereof relative to the retaining system 22.

The retaining system 22 comprises a collar 34 which is fixed to the first side portion 24 and which surrounds the through-orifice 24.1 of the first side portion 24 and is configured to be housed in the second through-hole 20.2 of the second part 12.

According to one embodiment, the retaining system 22 is made of plastics material and can be resiliently deformed to permit a spacing between the first and second side portions 24, 26.

During operation, the assembly formed by the nut 18 and the retaining system 22 is positioned on the second part 12. The first and second side portions 24, 26 are slightly spaced apart to permit the positioning of the collar 34 in the second through-hole 20.2 of the second part 12.

Accordingly, the first and second parts 10, 12 can be handled to align the first and second through-holes 20.1, 20.2 without it being necessary for a technician to retain the nut 18. Once the first and second through-holes 20.1, 20.2 are aligned, the screw 16 can be introduced into the first and second through-holes 20.1, 20.2 and screwed into the nut 18. During the screwing operation, the nut 18 is locked in rotation by the retaining system 22 which is in turn locked in rotation by its base 28 which comes into abutment with the narrow edge 12.3.

This retaining system 22 is not entirely satisfactory for the following reasons. According to a first drawback, the second part 12 is not able to exceed a certain width, in order to permit the positioning of the retaining system 22.

According to a further drawback, the first and second parts 10, 12 cannot be in contact with one another around the first and second through-holes 20.1, 20.2.

Finally according to a further drawback, if the second part 12 is too narrow, at least one of the first and second side portions 24, 26 will be deformed and bent as illustrated in FIG. 3 during the tightening of the bolt 14. If this deformation is too great, the retaining system 22 will break in the region of the joining area connecting the base 28 and one of the first and second side portions 24, 26, and the nut 18 can no longer be retained by means of the retaining system 22.

SUMMARY OF THE INVENTION

The present invention aims to remedy all or some of the drawbacks of the prior art.

To this end, the subject of the invention is an assembly comprising:

a nut having a first body which extends between the first and second end faces, in addition to a hole which is at least partially tapped and which opens out at least in the region of the first end face, a retaining system which is configured to retain the hole of the nut substantially in the extension of a through-hole of a part which opens out in the region of a contact face of the part in contact with the first end face of the nut during operation, the retaining system and the nut having shapes which cooperate to connect the nut and the retaining system.

According to the invention, the retaining system comprises at least two resilient tabs which are configured to be housed in the through-hole of the part, each resilient tab comprising a free end and being configured to adopt an undeformed state in addition to a deformed state in a resilient manner; the free ends being positioned, in the undeformed state, on a circle having a greater diameter than an internal diameter of the through-hole. In addition, the nut has an axis of rotation and comprises at least two radial extensions which extend from the first body in a radial direction perpendicular to the axis of rotation and which are distributed evenly about the nut, each radial extension having a bearing face which is positioned in a transverse plane perpendicular to the axis of rotation. The retaining system also comprises a second body which is positioned about the first body of the nut, the cooperating shapes comprising at least two radial projections which are fixed to the first body of the nut and, for each radial projection, an aperture passing through the second body of the retaining system. Finally, the second body comprises, for each aperture, a slot which is configured to permit each radial projection to penetrate into the corresponding aperture. Thus the retaining system for the nut does not comprise any part which is interposed between the parts of a mounting system and can be fixed to a part of the mounting system, whatever the thickness thereof, without the risk of damaging said retaining system.

According to a further feature, each resilient tab comprises a first part which is connected to the second body and which extends in an axial direction, in addition to a second inclined part which is positioned between the first part and the free end, the second parts of the resilient tabs being flared in the direction of their free end.

According to a further feature, the radial extensions and the radial projections coincide.

According to a further feature, the second body has a first narrow edge in the vicinity of the first end face of the first body of the nut, the first narrow edge comprising, in an unscrewing direction of the nut, a first transverse portion positioned upstream of the aperture, a second inclined portion connecting the first portion and the slot, a third transverse portion perpendicular to the aperture, in addition to a fourth axial portion positioned downstream of the aperture.

According to a further feature, the resilient tabs are positioned in the extension of the areas of the second body which are located, for each aperture, between the fourth axial portion of the first narrow edge and the aperture.

According to a further feature, the slot has a shape which widens as it moves away from the aperture.

According to a further feature, the radial extensions and the radial projections are separate, the radial projections being interposed between the radial extensions and the resilient tabs being positioned in the extension of the apertures.

According to a further feature, the retaining system comprises a flap which has a curved end and which is configured to bear against the second part during operation in order to limit a rotational movement of the retaining system relative to the second part.

According to a further feature, the curved end comprises a face which is oriented toward the second part during operation, in addition to a coating made of flexible material on this face which is oriented toward the second part during operation.

According to a further feature, each retaining system comprises diametrically opposing first and second flaps which are positioned in a transverse plane, the first flap of a first retaining system comprising a first end which is configured to cooperate with a second end of the second flap of a second retaining system.

A further subject of the invention is a mounting system comprising at least first and second parts, in addition to at least one bolt connecting the first and second parts and comprising a nut of an assembly according to one of the preceding features, the second part having a contact face which is in contact with the nut, in addition to a through-hole which opens out in the region of the contact face and which houses the resilient tabs of the retaining system connected to the nut.

According to a further feature, each resilient tab comprises a first part which extends in an axial direction, in addition to a second inclined part which is positioned between the first part and the free end, the second parts of the resilient tabs being flared in the direction of their free end. In addition, the through-hole of the second part comprises a first section which opens out in the region of the contact face and which is substantially cylindrical and is configured to receive the first part of each resilient tab, in addition to a second section in the extension of the first section which is flared as it moves away from the second contact face of the second part and which is configured to house the second part of each resilient tab.

BRIEF DESCRIPTION OF THE DRAWINGS

Further features and advantages will be found in the following description of the invention, the description being given solely by way of example with reference to the accompanying drawings, in which:

FIG. 2 is a perspective view of a retaining system illustrating the embodiment of the prior art, FIG. 3 is a lateral view of the retaining system which can be seen in FIG. 2, FIG. 5 is a perspective view of a nut and a retaining system illustrating an embodiment of the invention, FIG. 6 is a section illustrating a detail of FIG. 4, FIG. 7 is a perspective view of a nut and a retaining system illustrating a further embodiment of the invention, FIG. 8 is a perspective view of a mounting system comprising a plurality of nuts and retaining systems as illustrated in FIG. 7.

DETAILED DESCRIPTION OF THE PREFERRED EMBODIMENTS

Figure 1:
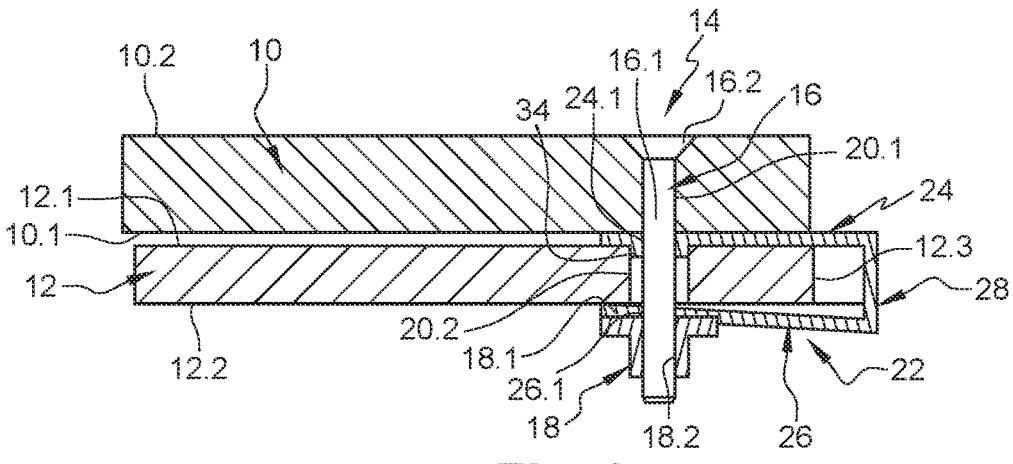
FIG. 1 is a schematic section of a mounting system illustrating an embodiment of the prior art.
Figure 4:
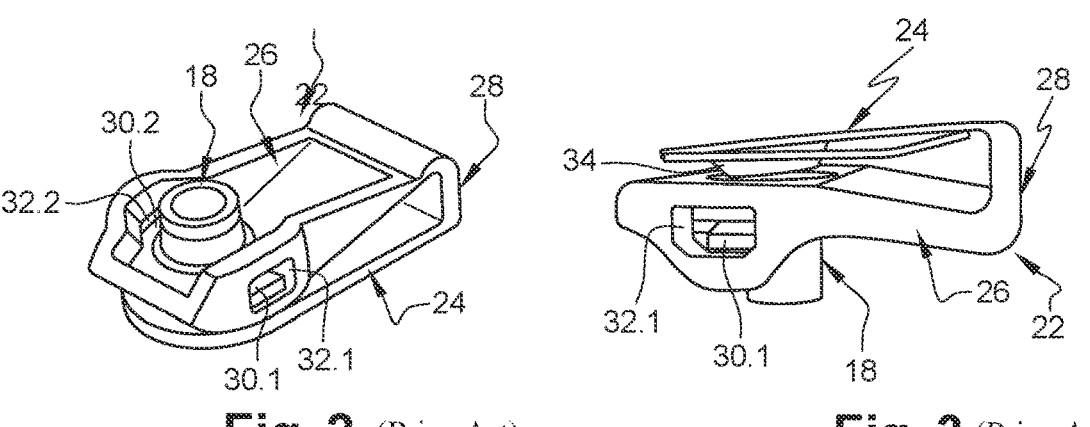
FIG. 4 is a schematic section of a mounting system illustrating an embodiment of the invention.

According to an embodiment which can be seen in FIG. 4, a mounting system 38 comprises at least first and second parts 40, 42, in addition to at least one bolt 44 connecting the first and second parts 40, 42. The bolt 44 comprises, on the one hand, a screw 46 which has a shank 46.1 which is at least partially threaded, in addition to a head 46.2 and, on the other hand, a nut 48 which has at least one bearing face 48.1 in addition to a hole 48.2 which is at least partially tapped and configured to be screwed onto the shank 46.1 of the screw 46. The first part 40 comprises a first through-hole 50.1 which is configured to permit the passage of the shank 46.1 of the screw 46, and which opens out in the region of the first and second faces 40.1, 40.2, the first face 40.1 being oriented toward the second part 42. The second part 42 comprises a second through-hole 50.2 which is configured to permit the passage of the shank 46.1 of the screw 46 and which opens out in the region of the first and second faces 42.1, 42.2, the first face 42.1 being oriented toward the first part 40. The second part 42 has a narrow edge 42.3 in the vicinity of the second through-hole 50.2. This through-hole has an internal diameter D50.2 in the region of the second face 42.2, the so-called contact face.

According to one arrangement, the head 46.2 of the screw 46 is a milled head in contact with the first part 40. In addition, the first through-hole 50.1 has a milled portion in the region of the second face 40.2 of the first part 40. Naturally, the invention is not limited to this embodiment for the screw 46.

According to one embodiment, the tapped hole 48.2 comprises an axis of rotation A48. Hereinafter, a radial direction is perpendicular to the axis of rotation A48 and an axial direction is a direction parallel to the axis of rotation A48. A transverse plane is perpendicular to the axis of rotation A48.

The nut 48 comprises a first body 52 which extends between the first and second end faces 52.1, 52.2, the first end face 52.1 corresponding to the bearing face 48.1 of the nut 48 and being oriented toward the second part 42 during operation, and the hole 48.2 opening out at least in the region of the first end face 52.1. The first and second end faces 52.1, 52.2 are substantially perpendicular to the axis of rotation A48.

According to one configuration, the first body 52 has a cylindrical section 54.1 which extends from the second end face 52.2, in addition to a flared section 54.2 which extends the cylindrical section 54.1 as far as the first end face 52.1 and is progressively flared in the direction of the first end face 52.1. This flared shape facilitates the introduction of the shank 46.1 of the screw 46 into the tapped hole 48.2 of the nut 48 and the centering thereof relative to this nut. Naturally, the invention is not limited to this shape for the first body 52 of the nut 48.

The nut 48 comprises at least two radial extensions 56.1 to 56.3 which extend from the first body 52 in a radial direction. These radial extensions 56.1 to 56.3 are distributed evenly about the axis of rotation A48. According to one arrangement, the nut 48 comprises three radial extensions 56.1 to 56.3 forming an angle of approximately 120° between one another. Each radial extension 56.1, 56.3 has a bearing face F which is positioned in a transverse plane and is coplanar with the first end face 52.1 of the first body 52 of the nut 48. This configuration makes it possible to enlarge the bearing face 48.1 of the nut 48 and thus the contact surface between the nut 48 and the second part 42.

The bolt 44 comprises a retaining system 58 which is configured to retain the at least partially tapped hole 48.2 of the nut 48 substantially in the extension of the second through-hole 50.2 of the second part 42. This retaining system 58 has a second body 60 which is positioned about the first body 52 of the nut 48. According to one configuration, the second body 60 is tubular and approximately cylindrical. This body 60 is axisymmetric and has an axis of revolution A60. During operation, the axes A48 and A60 substantially coincide. The second body 60 has an external diameter D60Ext and an internal diameter D60Int which can be seen in FIG. 6.

This second body 60 extends between a first narrow edge 60.1 in the vicinity of the first end face 52.1 of the first body 52 of the nut 48 and a second narrow edge 60.2 in the vicinity of the second end face 52.2 of the first body 52 of the nut 48. According to one configuration, the second narrow edge 60.2 is positioned in a transverse plane.

The retaining system 58 and the nut 48 have cooperating shapes 62, 62' which are configured to connect the nut 48 (more particularly its body 52) and the retaining system 58 (more particularly its second body 60) and to retain the nut 48 in a position which is approximately centered relative to the second body 60. According to one embodiment, these cooperating shapes 62, 62' are also configured to limit the rotation along the axis of rotation A48 of the nut 48 relative to the retaining system 58. According to one arrangement, the cooperating shapes 62, 62' are configured to immobilize the nut 48 in terms of rotation about the axis of rotation A48 relative to the retaining system 58. According to one embodiment, the cooperating shapes 62, 62' are also configured to limit the translation of the nut 48 in an axial direction relative to the retaining system 58.

According to one embodiment, the cooperating shapes 62, 62' comprise at least two radial projections 62 which are fixed to the first body 52 of the nut 48, in addition to a housing 62', for each radial projection 62, which is fixed to the second body 60 of the retaining system 58. Each radial projection 62 has a thickness (dimension taken in an axial direction) and a width (dimension taken in a plane perpendicular to the axis A48 and in a direction perpendicular to a radial direction)

Figures 9, 10, 11:
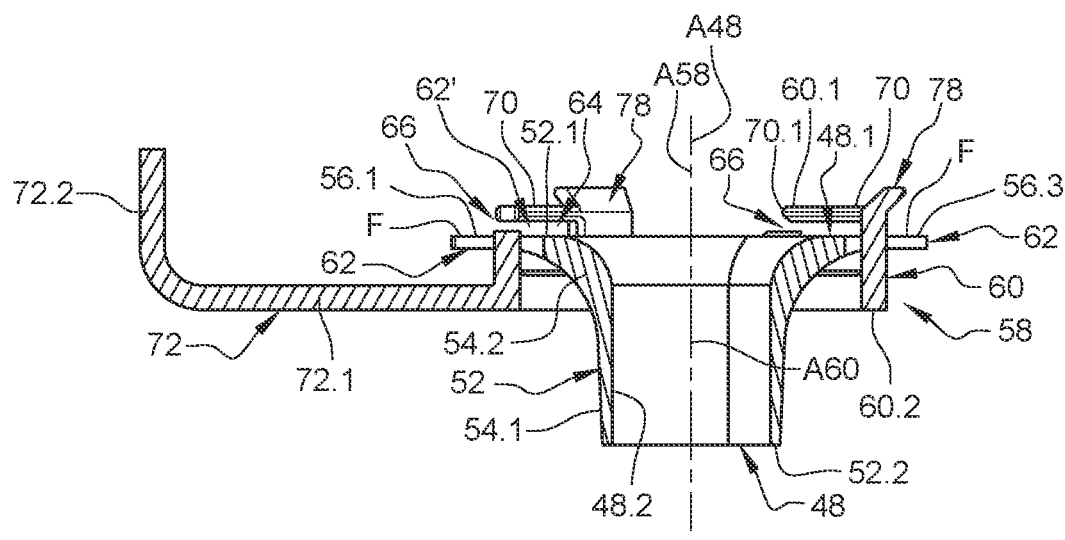
FIG. 9 is a section of a nut and a retaining system illustrating a further embodiment of the invention.
FIG. 10 is a perspective view of the nut and the retaining system which can be seen in FIG. 9.
FIG. 11 is a lateral view of the retaining system which can be seen in FIGS. 9 and 10.

According to a configuration which can be seen in FIGS. 9 and 10, the radial extensions 56.1 to 56.3 and the radial projections 62 coincide.

According to a further configuration which can be seen in FIGS. 4 to 8, the radial extensions 56.1 to 56.3 and the radial projections 62 are separate. According to this configuration, each radial projection 62 is present in the form of a tab which has faces which are parallel to one another and which are positioned in transverse planes.

The radial projections 62 are distributed evenly about the axis of rotation A48 of the nut 48. In the case of the configuration which can be seen in FIGS. 4 to 8, the nut 48 comprises three radial projections 62 interposed between the radial extensions 56.1 to 56.3.

Apart from the radial extensions 56.1 to 56.3 and the radial projections 62, the body 52 of the nut 48 has a maximum diameter which is less than or equal to the internal diameter D60Int of the second body 60 of the retaining system 58.

According to one embodiment, each housing 62' is present in the form of an aperture 64 which passes through the second body 60 of the retaining system 58. Each aperture 64 has a substantially rectangular contour, a width (dimension taken along the circumference of the second body 60) which is substantially equal to that of the corresponding radial projection 62 (housed in said aperture 64) in addition to a height (dimension taken in an axial direction) which is greater than the height of the corresponding radial projection 62.

Thus the radial projections 62 and the apertures 64 are dimensioned so as to permit a displacement in an axial direction between the nut 48 and the retaining system 58. This solution makes it possible to ensure that the nut 48 is in contact with the second part 42 when the nut 48 is tightened. By way of example, the height of the aperture 64' is between 2 and 5 times the height of the corresponding radial projection 62.

According to a configuration illustrated in detail in FIG. 11, each aperture 64 comprises a first transverse edge 64.1 oriented toward the first narrow edge 60.1 of the second body 60, a second transverse edge 64.2 oriented toward the second narrow edge 60.2 of the second body 60 and substantially parallel to the first transverse edge 64.1, an upstream axial edge 64.3 connecting the first and second transverse edges 64.1, 64.2, in addition to a downstream axial edge 64.4 connecting the first and second transverse edges 64.1, 64.2. The terms upstream and downstream refer to the unscrewing direction Fd of the nut 48 which can be seen in FIG. 11 and which passes from upstream to downstream.

According to one embodiment, which can be seen in FIGS. 9 and 10, the second body 60 comprises, for each aperture 64, a slot 66 which is configured to permit each radial projection 62 to penetrate into its aperture 64.

According to one arrangement, the slot 66 is located in the extension of the first transverse edge 64.1 and opens out in the region of the upstream axial edge 64.3.

For each aperture 64, the first narrow edge 60.1 of the second body 60 comprises in the upstream to downstream direction (corresponding to the unscrewing direction of the nut 48) a first transverse portion 68.1 which is positioned upstream of the aperture 64, approximately in the same transverse plane as the second transverse edge 64.2 of the aperture 64, a second inclined portion 68.2 connecting the first portion 68.1 and the slot 66, a third transverse portion 68.3 perpendicular to the aperture 64, delimiting with the aperture 64 and the slot 66 a narrow strip of material 70, in addition to a fourth axial portion 68.4 which is substantially parallel to the axial direction and positioned downstream of the aperture 64. The second inclined portion 68.2 promotes the introduction of each radial projection 62 into its aperture 64. The narrow strip of material 70 comprises a free end 70.1 which has a beveled shape. Thus the slot 66 has a shape which widens as it moves away from the aperture 64 to promote the introduction of each radial projection 62 into its aperture 64.

Naturally the invention is not limited to these embodiments relating to the cooperating shapes 62, 62' of the retaining system 58 and the nut 48.

The second body 60 of the retaining system 58 has an external diameter D60Ext which is less than or equal to the diameter of the second through-hole 50.2 of the second part 42 so that each part of the second body 60, which protrudes relative to the radial extensions 56.1 to 56.3, can be housed in the second through-hole 50.2 so that said radial extensions 56.1 to 56.3 are in contact with the second part 42.

According to one embodiment, the retaining system 58 is configured to limit its movement in rotation about the axis of rotation A58.

According to one configuration which can be seen, in particular, in FIGS. 4 and 5, the retaining system 58 comprises a flap 72 which has a curved end and which is configured to bear against the second part 42 and thus limit the movement in rotation about the axis of rotation A48 of the retaining system 58 relative to the second part 42. The flap 72 comprises a first part 72.1 which is connected to the second body 60 and positioned in a transverse plane, in addition to a second part 72.2 which is substantially perpendicular to the first part 72.1 and configured to bear against the narrow edge 42.3 of the second part 42. According to one arrangement, the curved end corresponding to the second part 72.2 comprises a coating 74 made of flexible material, such as an elastomer for example, which is applied to its face oriented toward the narrow edge 42.3 of the second part 42 during operation. According to this configuration which can be seen in FIGS. 4 and 5, the retaining system 58 is locked in rotation relative to the second part 42.

According to a further configuration which can be seen in FIGS. 7 and 8, at least two retaining systems 58, 58' are locked in rotation with one another. According to this configuration, each retaining system 58, 58' comprises first and second flaps 76, 76' which are diametrically opposing and positioned in a transverse plane, the first flap 76 comprising a first end 76.1 cooperating with a second end 76.1' of the second flap 76'. By way of example, the second end 76.1' of the second flap 76' has a hollow shape which is delimited by two branches and is configured to receive the first end 76.1 of the first flap 76 which is immobilized between the two branches. The first and second ends 76.1, 76.1' of the first and second flaps 76, 76' have complementary shapes.

According to one feature, the retaining system 58 is configured to be able to be fixed to the second part 42. To this end, the retaining system 58 comprises at least two resilient tabs 78, which protrude relative to the first narrow edge 60.1 of the second body 60 and are located in the extension of said second body 60, each having a first end 78.1 connected to the second body 60 in addition to a second free end 78.2.

Each resilient tab 78 is configured to adopt an undeformed state in addition to a deformed state in a resilient manner, the resilient tab 78 automatically returning to the undeformed state in the absence of stress. The resilient tabs 78 are flared in the direction of their free end 78.2 such that in the undeformed state their second ends 78.2 are positioned on a circle having a greater diameter than the internal diameter D50.2 of the second through-hole 50.2 in the region of the second contact face 42.2.

Thus the resilient tabs 78 are retained in the second through-hole 50.2, which makes it possible to maintain the retaining system 58 and thus the nut 48, which are fixed to the second part 42, in the extension of the second through-hole 50.2.

According to one configuration, the retaining system 58 comprises three resilient tabs 78 which are evenly distributed over the circumference of the second body 60.

According to the embodiment which can be seen in FIGS. 4 to 6, the resilient tabs 78 are located in the extension of the apertures 64.

According to the embodiment which can be seen in FIGS. 9 to 11, the resilient tabs 78 are located in the extension of the areas of the second body 60 and are positioned, for each aperture 64, between the fourth axial portion 68.4 of the first narrow edge 60.1 and the aperture 64, as illustrated in FIG. 11.

As illustrated in FIG. 6, to ensure an improved hold of the resilient tabs 78 in the second through-hole 50.2, each resilient tab 78 comprises a first part 80.1 connected to the second body 60 which extends in an axial direction (parallel to the axis A60), in addition to a second inclined part 80.2 positioned between the first part 80.1 and the second free end 78.2 of each resilient tab 78. According to this arrangement, the second inclined parts 80.2 of the resilient tabs 78 are flared in the direction of their free end 78.2.

In addition, the second through-hole 50.2 has a first section 82.1 which opens out and which is substantially cylindrical and configured to receive the first part 80.1 of each resilient tab 78, in addition to a second section 82.2 in the extension of the first section 82.1 which is flared as it moves away from the second contact face 42.2 of the second part 42 and which is configured to house the second part 80.2 of each resilient tab 78. The first and second sections 82.1, 82.2 of the second through-hole 50.2, in addition to the first and second parts 80.1, 80.2 of the resilient tabs 78, are configured so that in the undeformed state the first and second parts 80.1, 80.2 of the resilient tabs 78 are in contact with the wall of the second through-hole 50.2, respectively in the region of the first and second sections 82.1, 82.2 of the second through-hole 50.2.

By providing the resilient tabs 78 which are configured to be housed in the second through-hole 50.2 of the second part 42 from the second face thereof, this makes it possible to design a retaining system 58 for the nut 48 without any part between the first and second parts 40, 42, and which can be fixed to the second part 42, whatever the thickness thereof, without the risk of damaging said retaining system 58.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly comprising:
a nut having a first body which extends between first and second end faces and comprises a hole which is at least partially tapped and which opens out in a region of the first end face, and
a retaining system configured to retain the hole of the nut substantially in an extension of a through-hole of a part which opens out in a region of a contact face of a part in contact with the first end face of the nut during operation,
wherein the retaining system and the nut comprise shapes which cooperate to connect the nut and the retaining system,
wherein the retaining system comprises at least two resilient tabs which are configured to be housed in the through-hole of the part, each resilient tab comprising a free end and being configured to adopt an undeformed state and a deformed state in a resilient manner, the free ends being positioned, in the undeformed state, on a circle having a greater diameter than an internal diameter of the through-hole, in that the nut has an axis of rotation and comprises at least two radial extensions which extend from the first body in a radial direction perpendicular to an axis of rotation and which are distributed evenly about the nut, each radial extension having a bearing face which is positioned in a transverse plane perpendicular to the axis of rotation,
wherein the retaining system further comprises a second body positioned about the first body of the nut,
wherein the cooperating shapes comprise at least two radial projections which are fixed to the first body of the nut and, for each radial projection, an aperture passing through the second body of the retaining system, and
wherein the second body comprises, for each aperture, a slot which is configured to permit each radial projection to penetrate into the corresponding aperture.

2. The assembly as claimed in claim 1, wherein each resilient tab comprises a first part which extends in an axial direction, and a second inclined part which is positioned between the first part and the free end, the two parts of the resilient tabs being flared in a direction of their free end.

3. The assembly as claimed in claim 1, wherein the radial extensions and the radial projections coincide.

4. The assembly as claimed in claim 1, wherein the second body has a first narrow edge in an vicinity of the first end face of the first body of the nut, and
wherein the first narrow edge comprises, in an unscrewing direction of the nut, a first transverse portion positioned upstream of the aperture, a second inclined portion connecting the first portion and the slot, a third transverse portion perpendicular to the aperture, and a fourth axial portion positioned downstream of the aperture.

5. The assembly as claimed in claim 4, wherein the resilient tabs are positioned in the extension of areas of the second body which are located, for each aperture, between the fourth axial portion of the first narrow edge and the aperture.

6. The assembly as claimed in claim 1, wherein the slot has a shape which widens as the slot moves away from the aperture.

7. The assembly as claimed in claim 1, wherein the radial extensions and the radial projections are separate, and in that the radial projections are interposed between the radial extensions, the resilient tabs being positioned in the extension of the apertures.

8. The assembly as claimed in claim 1, wherein the retaining system comprises a flap which has a curved end and which is configured to bear against the second body during operation in order to limit a rotational movement of the retaining system relative to the second body.

9. The assembly as claimed in claim 8, wherein the curved end comprises a face which is oriented toward the second body during operation, and a coating made of flexible material on the face which is oriented toward the second body during operation.

10. The assembly as claimed in claim 1, wherein each retaining system comprises diametrically opposing first and second flaps which are positioned in a transverse plane, the first flap of a first retaining system comprising a first end which is configured to cooperate with a second end of the second flap of a second retaining system.

11. A mounting system comprising:
at least first and second parts,
at least one bolt connecting the first and second parts, and
the assembly as claimed in claim 1, the second part having a contact face which is in contact with the nut, and a through-hole which opens out in the region of the contact face and which houses the resilient tabs of the retaining system connected to the nut.

12. The mounting system as claimed in claim 11, wherein each resilient tab comprises a first part which extends in an axial direction,
wherein a second inclined part is positioned between the first part and the free end,
wherein the second parts of the resilient tabs are flared in a direction of the respective free end,
wherein the through-hole of the second part comprises a first section which opens out in a region of the contact face and which is substantially cylindrical and configured to receive the first part of each resilient tab,
wherein a second section in the extension of the first section is flared as the second section moves away from the second contact face of the second part and which is configured to house the second part of each resilient tab.

* * * * *